United States Patent
Vereecke et al.

(10) Patent No.: US 8,631,634 B2
(45) Date of Patent: Jan. 21, 2014

(54) AGRICULTURAL HARVESTER WITH AUTOMATIC HEADER COUPLING

(75) Inventors: Gilian Vereecke, Dudzele (BE); Jonas Van Den Broucke, Lissewege (BE); Didier O. M. Verhaeghe, Ieper (BE)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 13/576,341

(22) PCT Filed: Feb. 2, 2011

(86) PCT No.: PCT/EP2011/051497
§ 371 (c)(1),
(2), (4) Date: Aug. 28, 2012

(87) PCT Pub. No.: WO2011/095525
PCT Pub. Date: Aug. 11, 2011

(65) Prior Publication Data
US 2012/0317951 A1    Dec. 20, 2012

(30) Foreign Application Priority Data

Feb. 2, 2010   (BE) .................................. 2010/0053

(51) Int. Cl.
*A01D 34/00* (2006.01)
(52) U.S. Cl.
USPC ........................................................ 56/14.9
(58) Field of Classification Search
USPC ............. 56/14.9, 14.5, 14.6, 11.1, 11.2, 11.3, 56/10.9, 192, 193, 153, DIG. 1, DIG. 5, 56/DIG. 21; 280/525, 504; 172/272, 678
See application file for complete search history.

(56) References Cited

U.S. PATENT DOCUMENTS

| | | | | |
|---|---|---|---|---|
| 3,324,637 | A * | 6/1967 | Windsor et al. | 56/15.6 |
| 3,431,711 | A * | 3/1969 | Claas | 56/15.6 |
| 3,561,789 | A * | 2/1971 | Stikeleather et al. | 172/272 |
| 3,572,759 | A * | 3/1971 | Baugh et al. | 172/272 |
| 4,280,317 | A * | 7/1981 | Lindblom et al. | 56/15.6 |
| 4,368,899 | A * | 1/1983 | Smalley et al. | 280/477 |
| 4,444,000 | A * | 4/1984 | Enzmann et al. | 56/15.6 |
| 4,707,972 | A * | 11/1987 | Knepper | 56/10.2 R |
| 4,742,671 | A * | 5/1988 | Bich | 56/15.9 |
| 5,697,454 | A * | 12/1997 | Wilcox et al. | 172/447 |
| 6,318,057 | B1 * | 11/2001 | Burmann | 56/10.2 R |
| 6,478,094 | B2 * | 11/2002 | Alexander et al. | 172/439 |
| 6,510,680 | B2 * | 1/2003 | Uhlending et al. | 56/208 |
| 6,519,923 | B1 * | 2/2003 | Cooksey et al. | 56/14.9 |
| 6,735,929 | B2 * | 5/2004 | Watts et al. | 56/14.9 |
| 7,364,181 | B2 * | 4/2008 | Patterson | 280/504 |
| 7,497,459 | B2 * | 3/2009 | Johnson et al. | 280/515 |
| 8,322,122 | B2 * | 12/2012 | Dold et al. | 56/15.6 |
| 2008/0256914 | A1 * | 10/2008 | Ricketts et al. | 56/10.8 |

* cited by examiner

*Primary Examiner* — Árpád Fábián-Kovács
(74) *Attorney, Agent, or Firm* — Patrick M. Sheldrake; Seyed V. Sharifi T.

(57) ABSTRACT

Automatic coupling of a header to a feeder in an agricultural machine. The agricultural machine comprises a feeder (1) and a detachable header (2), the feeder comprising at least one or more rotatable cams (15) and hooks (16), rotatable around a common axis (14), the cams being arranged to gradually lower the distance between the feeder and the header, by rotating the cams (15) away from the header, the hooks being arranged to grip a bar or pin (18) located on the header as the cams are being rotated away from the header, thereby securing the header to the feeder.

9 Claims, 5 Drawing Sheets

AGRICULTURAL HARVESTER WITH AUTOMATIC HEADER COUPLING

TECHNICAL FIELD

The present invention is related to agricultural harvesting machines, such as combine or forage harvesters, and in particular to the automatic coupling of a header to the feeder of the harvesting machine.

BACKGROUND ART

In many existing combine harvesters, the coupling of a header to the feeder or straw elevator of the combine is an operation involving a number of steps, several of which require manual intervention by the combine operator. To establish an initial connection, the header is positioned on the ground and the operator drives the combine up to the header. Thereby first lowering the feeder and subsequently lifting the header up, for example by means of a hydraulic lifting system, until an interlocking contact is established, e.g. between a cradle on the feeder and an interlocking beam on the header. The feeder then further lifts up the header until the header rests against the front surface of the feeder. At that point, the operator needs to manually secure the header by a suitable locking mechanism, e.g. by rotating a hook located at the underside of the contact zone until it grabs a pin or bar located at the rear of the header. After that, the operator manually connects the drive shaft of the header to the drive shaft of the feeder. Such manual operations are often impractical and time consuming, so a number of efforts have been made to automate the coupling procedure. Patent publication EP-A-1884151 discloses a system comprising a movable gearbox and a telescopic jack shaft assembly for establishing an automatic connection of the drive shafts after the initial interlocking. Patent publication US-A-2008/0256914 is related to another system, involving a stationary gearbox secured to the feeder, and a telescopic jack shaft assembly. In both of these known systems, the coupling is realized by a lateral movement (perpendicular to the driving direction of the combine), which requires the presence of hydraulic actuators for coupling the drive shafts. Also, these known arrangements do not allow a lateral floatation of the header with respect to the combine feeder, i.e. a variation of the angle between the header and the ground around a central longitudinal axis.

SUMMARY

It is an object of the invention to provide a combination of a harvesting machine and a header having improved systems and/or methods of automatic coupling.

The present invention provides an agricultural machine comprising a feeder and a detachable header, the feeder comprising a component that lifts up the header from the ground, the component that lifts up (e.g., a lifting component; or a lifting means) further comprising a cradle or similar lifting surface for supporting a beam or the like of the header, characterized in that:

the feeder comprises at least one or more rotatable cams located lower than the cradle, and an actuating component that rotates the cams around an axis (e.g., means for rotating the cams around an axis), wherein the cams and the actuating component are configured to:
  maintain the header at a distance from the feeder, after the header has been lifted from the ground, by extending the cams towards a support surface of the header,
  gradually reduce the distance between the feeder and the header, by rotating the cams away from the support surface of the header, the support surface with which the cams are in contact during at least a part of their rotation,
the feeder further comprises one or more hooks, configured to be able to rotate—wherein such rotation is being actuated by the same actuating component—around the same axis as the cams, whilst maintaining a fixed relative position with respect to the cams, said position being such that the hooks rotate towards the header while the cams move away from the support surface of the header, so that the hooks thereby grip a bar or pin located on the header, thereby securing the header to the feeder.

The agricultural machine according to the invention offers the advantage that a reliable, automatic drive coupling becomes possible requiring only a minimal amount of actuators.

The invention also provides a method for coupling a header to a feeder of an agricultural machine, comprising the steps of:
  Driving the agricultural machine with the feeder attached at the front, up to the header;
  Positioning cams on the feeder, located lower than the cradle, to maintain the header at a distance from the feeder;
  Lowering the feeder until a cradle on the feeder is placed under a beam on the header and driving the agricultural machine a little bit forward;
  Lifting up the header with the feeder, so that it hangs on to the cradle;
  Rotating cams away from the header, thereby reducing the distance between the feeder and the header;
  Simultaneously with the rotation of the cams, rotating the hooks around the same rotation axis as the cams, until the hooks grip a bar or pin located on the header, to thereby secure the header.

MODE(S) FOR CARRYING OUT THE INVENTION

Preferred embodiments will now be described with reference to the drawings. The detailed description is not limiting the scope of the invention, which is defined only by the appended claims.

Figure 1:
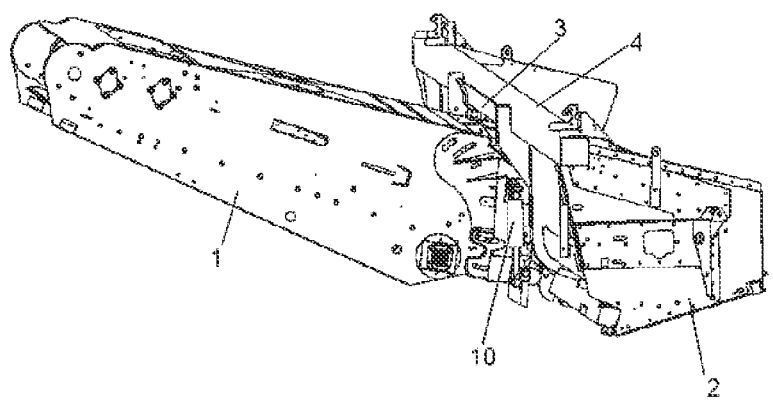
FIG. 1 is a three dimensional side view of a header and feeder in a combine harvester according to the invention, showing a cam and hook securing mechanism according to the invention in a non-secured position.

FIG. 1 shows a side view of a combine straw elevator or feeder 1 and a grain header 2 according to the present invention. The feeder 1 is operatively attached to the combine frame (not shown) in a known manner. The feeder comprises a lateral float frame 5 (FIG. 5), mounted at the front of the feeder, and arranged to be able to rotate with respect to the line of travel, to thereby allow lateral floatation of the header. The lateral float frame 5 can be a frame as known in the art. The invention is preferably related to a feeder comprising such a lateral float frame, but not limited thereto. The initial connection between the feeder 1 and the header 2 is established by interlocking the elevator cradle 3 of the feeder with an upper horizontal beam 4 of the header. Cradle 3 and beam 4 can be identical to parts in existing feeder/header combinations. In the position shown in FIG. 1, the header 2 has been lifted from the ground by the cradle/beam interlock, and the header 'hangs' on to the cradle 3. As shown in further detail in FIG. 2a, the feeder of the invention comprises a hydraulic cylinder 10, attached to a fixed point 11 on the lateral float frame 5 of the feeder. The telescopic rod 12 of the cylinder 10 is shown in its most extended state in FIGS. 1 and 2. The movement of the rod 12 actuates the rotation of a lever 13 and a transverse shaft 14, to which a cam element 15 and a hook element 16 are attached, i.e. the hook and cam rotate together with shaft 14 and are fixed with respect to each other. The hook and cam extend from the shaft 14, in such a manner that their respective rotations combine to rotate the lower part of the header towards the feeder, while the hook moves forward to secure the header, by grabbing a pin or hook 18 (see detail in FIG. 2b). For this purpose, the header is provided with abutments, such as plate elements 17, located in the same vertical plane as the cam elements 16 In the embodiment of FIGS. 1 to 3, a hydraulic cylinder 10 and a lever 13 is arranged on one side of the feeder and the shaft 14 extends towards the other side, carrying a hook and a cam on both sides of the feeder. It is also possible to provide a cylinder and lever on both sides of the feeder.

Figure 2A:
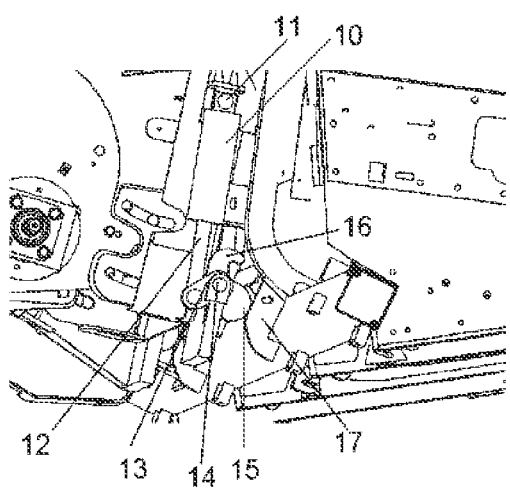
FIG. 2a is an enlarged side view of the same combination, showing a cam and hook securing mechanism according to the invention in a non-secured position.
Figure 2B:
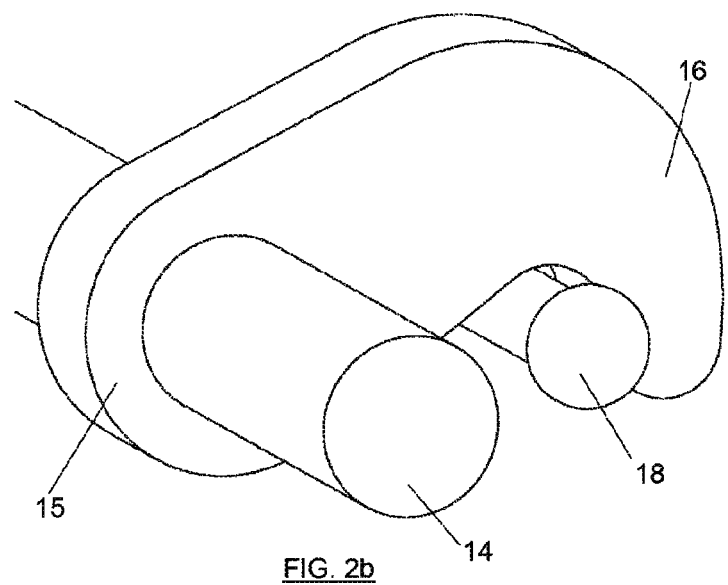
FIG. 2b shows a further detail of the securing mechanism.
Figure 3:
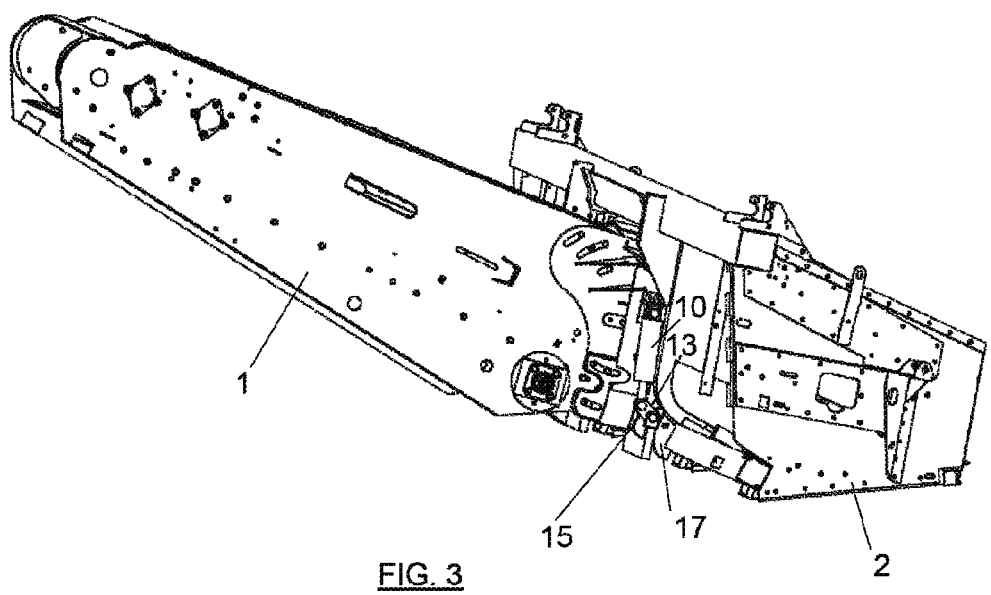
FIG. 3 is a side view of the header and feeder of FIG. 1, showing the cam and hook securing mechanism in a secured position.

In the non-secured starting condition shown in FIGS. 1 and 2a, because of the forward position of the cams 16 (one on each side), the underside of the header 2 is maintained at a distance from the underside of the feeder 1. Then the cylinder 10 is actuated and moves to the position shown in FIG. 3. This movement entails the gradual rotation of the cams 15 away from the header body, while staying in contact with the plate elements 17, thereby gradually reducing the distance between header and feeder. While the cams 15 retract from the header, the hooks 16 come forward and grab a transverse pin or bar 18 on the header, to thereby automatically secure the header. A side view of this end position is shown in FIG. 3.

Figure 4:
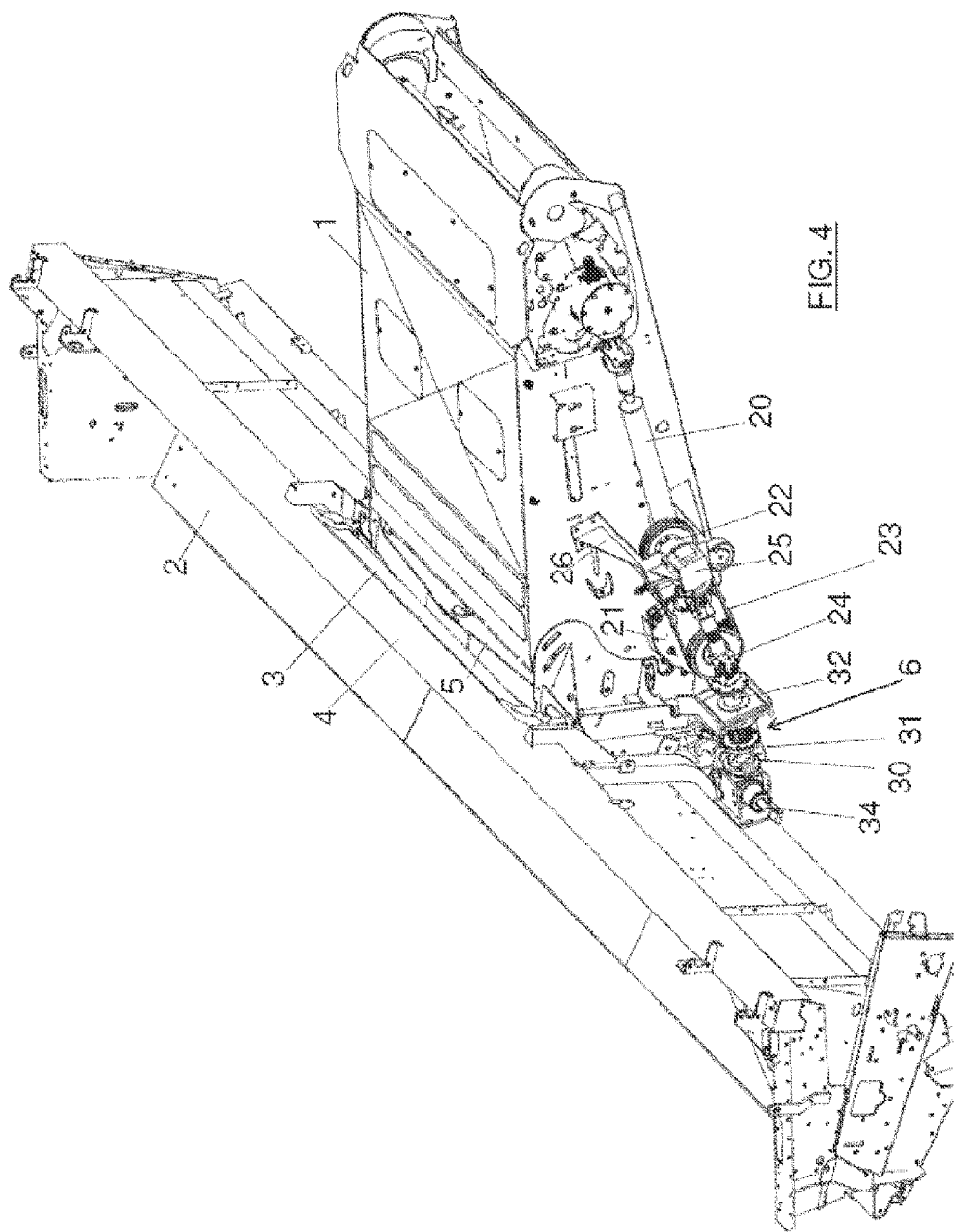
FIG. 4 is an opposite side view of the same combination in a non-secured position, showing the header and feeder drive shafts.

According to the preferred embodiment, the hook/cam mechanism is cooperatively arranged with respect to an automatic drive shaft coupling mechanism 6, as shown in FIG. 4. In the embodiment of FIG. 4, this drive shaft coupling mechanism is arranged to the left hand side of the feeder/header combination. It is the gradual movement of the header 2 towards the feeder 1 which is also the actuating movement for establishing the drive shaft coupling, as will be described in further detail hereafter.

In the embodiment shown in FIG. 4, and not to be seen as a limitation to the scope of the invention, the drive shaft coupling mechanism 6 itself is coupled to the drive shaft 20 of the feeder, by a belt transmission mechanism. The rotation of the drive shaft is converted into rotation of a transversely oriented shaft in the gearbox 21. The rotation of the transversely oriented shaft in turn is transmitted onto an auxiliary shaft 22 by a pulley and belt transmission 23. The auxiliary shaft 22 finally drives the rotation of the universal joint 24 through auxiliary gearbox 25. The location of the auxiliary shaft 22 is fixed with respect to the feeder by a first support bracket 26.

The coupling takes place by a pair of axial interlocking claws. The first claw 30 is mounted on the first axis of a 90° gearbox 33 attached to the header, the second axis of this gearbox being the header's drive shaft 34, which is configured to drive the rotating parts of the header (not shown), and which is essentially parallel to the rotation axis of these rotating parts. The orientation of the drive shaft 34 and type of gearbox 33 could be different from the one shown in FIG. 4, depending on the header type. What counts is that the coupling claw 30 facing the feeder is rotatably coupled to the header drive shaft, i.e. rotation of the coupling claw 30 causes rotation of the header drive shaft. The second claw 31 is mounted at the end of the coupling shaft 32, whose rotation is actuated by the universal joint 24. When the header 2 is rotated towards the feeder 1 by the action of the cams 15, the first claw 30 gradually approaches the second claw 31, until both claws interact and the coupling is established, when the rotation of the coupling shaft is started.

Figure 5:
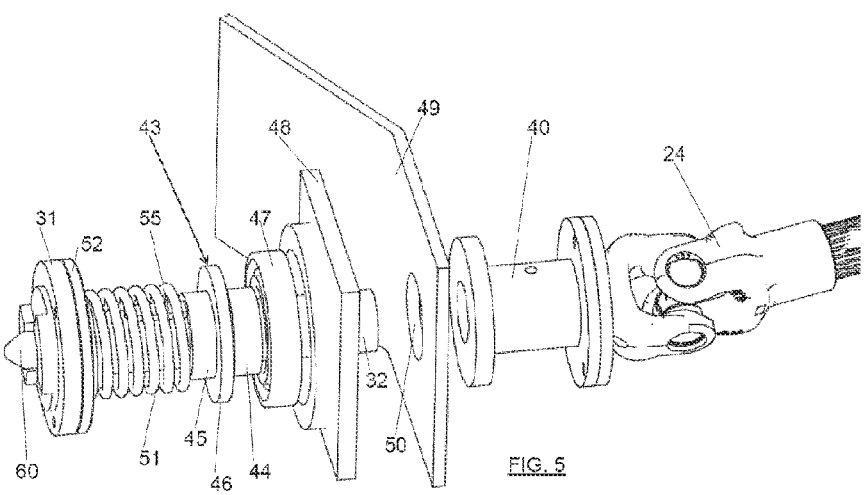
FIG. 5 is a blow-up of parts of the automatic coupling mechanism according to a preferred embodiment of the invention.

FIG. 5 shows a blow-up of the different machine parts arranged according to the preferred embodiment between the universal joint 24 and the second claw 31, and configured to guide the coupling shaft 32 during the coupling action. The coupling shaft 32 is fixed to a cylindrical coupling element 40, itself coupled to the end of the universal joint 24. The coupling shaft 32 is furthermore arranged to be axially slidable with respect to a slider element 43, having a cylindrical front and rear portion 44, 45 and a cylindrical central portion 46 with a higher diameter than the side portions. While being axially slidable with respect to the slider element 46, the coupling shaft 32 and the slider element 43 are coupled rotationally. This coupling is established by a radial protrusion 55 on the coupling shaft, which fits into a corresponding slat in the slider element. The protrusion 55 may be a separate coupling element fitted between the shaft and the slider. The rear portion 44 of the slider element 43 is clamped inside the rotatable inner ring of a ball bearing 47, which is itself mounted in a bearing housing 48. Bearing housing 48 is mounted in slidable contact with a second support bracket 49, fixed to the lateral float frame of the feeder. The support bracket 49 comprises an opening 50 through which the coupling shaft 32 extends. The opening 50 has a diameter which is larger than the diameter of the coupling shaft 32. A helical spring 51 is mounted between the central cylindrical portion 46 of slider element 43, and between a support plate 52, fixed to shaft 32 and to which support plate the claw 31 is attached. The claw 31 is provided with a central protrusion 60, which serves to align the claws into a mutually corresponding radial position. The facing claw 30 is then provided with a corresponding depression (described further in this description). The bearing housing 48 is pushed against the face of the bracket 49 by the spring force exerted by the spring 51, and is thus able to slide with respect to the bracket while staying in contact with the bracket. The bracket 49 may be provided with blocking mechanism that limit the movement of the bearing housing and thus for limiting the radial movement of the coupling shaft 32 within the hole 50, and thus to avoid contact and damage.

The resulting system allows for an axial movement of the coupling shaft 32 during coupling, as well as a limited radial movement, within the perimeter defined by the opening 50. These movements make it possible to establish the coupling automatically, as explained in detail hereafter, with reference to FIGS. 6a, 6b, 6c.

Figure 6A:
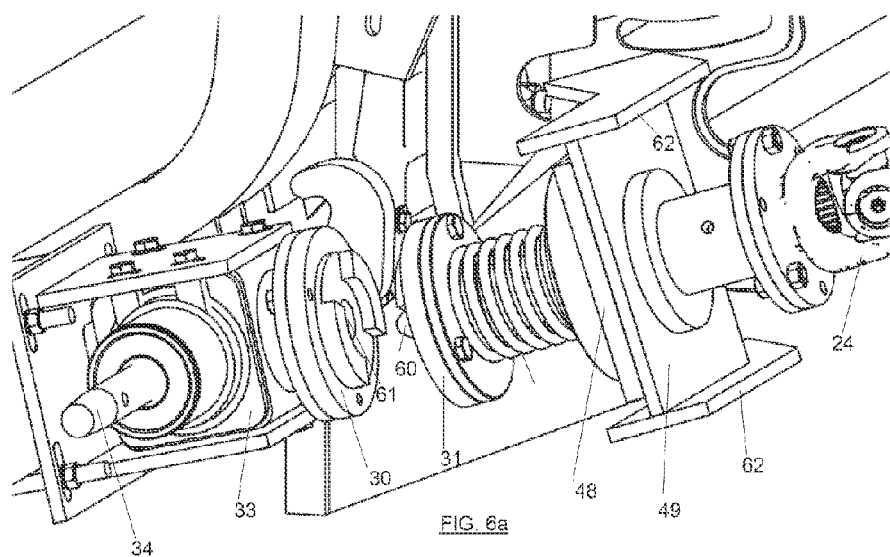
FIGS. 6a to 6c show three different stages in the coupling action between the header and feeder drive shafts in a header and feeder combination according to the invention.
Figure 6B:
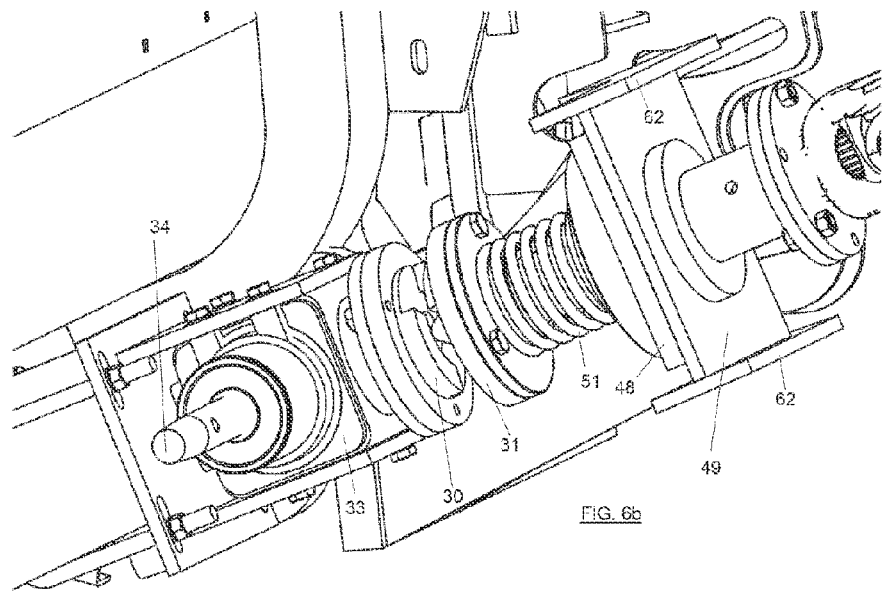
Figure 6C:
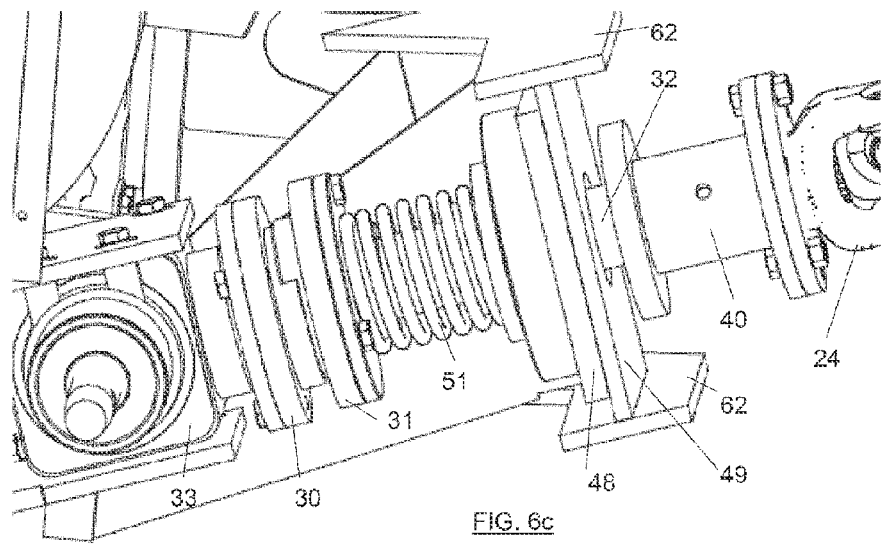

As stated, the coupling takes place by rotating the header towards the feeder through actuation of the hydraulic cylinders 10 from an extended state (rod 12 telescopically extended) to a retracted state (rod 12 retracted). This movement starts from a starting position, shown in FIG. 6a. As the header tilts backwards, the claw 30 connected to the header gearbox 33 gradually approaches the claw 31 attached to the coupling shaft 32. During this approach, the coupling shaft 32 is not rotating. Due to the allowed radial displacement of the coupling shaft (within opening 50), the claws 30 and 31 can be brought to face each other, with the help of the central protrusion 60 on claw 31, which serves to align the claws into a mutually corresponding radial position (see FIG. 6b). The facing claw 30 is provided with a corresponding depression 61, arranged to receive the protrusion 60. The approach of the header towards the feeder further causes the spring 51 to be compressed, i.e. the coupling element 40 is pushed back with respect to the support bracket 49, and the coupling shaft slides with respect to slider element 43, see FIG. 6c. FIGS. 6a-6c show an embodiment wherein the bracket 49 is provided with blocking mechanism 62, to limit the movement of the bearing housing 48. When the header has been lowered into its final position, the coupling shaft's rotation is actuated, and the claws interlock due to the spring force now pushing the claw 31 forward against the opposite claw 30, resulting in the automatic actuation of the header's drive shaft 34, through gearbox 33.

It is clear to the skilled person that a number of the above described features are not limiting to the scope of the invention. For example, the manner of actuation fox the rotation of the cam/hook combinations may be via any suitable actuating component, other than a hydraulic cylinder. The plate elements 17 can be any suitable abutment surface for the cams 15. The coupling of the universal joint 24 may take place without the belt transmission, but by directly coupling the joint 24 to the feeder drive shaft 20. The embodiment of FIG. 4 is specifically designed for a feeder equipped with gearbox 21 arranged for actuating a lateral rotation axis, as known in existing machines. The presence of an automatic coupling does not require such a gearbox.

When the feeder is not equipped with a lateral float frame, the bracket 49 is fixed to the side of the feeder, and no lateral floatation is possible, hence no or very limited radial movement of the coupling shaft 32 must be provided for.

The invention claimed is:

1. An agricultural machine with an automatic coupling system comprising:
    a feeder that is attachable to a header
    the feeder comprising a lifting component that lifts up the header from the ground for an automatic coupling thereof to the feeder, the lifting component comprising a cradle that supports a beam of the header,
    the feeder further includes;
        a cam that is rotatable around an axis, the cam located lower than the cradle, and
        an actuating component that rotates the cam around the axis wherein the cam and the actuating component are configured to:
    maintain the header at a distance from the feeder, after the header has been lifted from the ground, by extending the cam towards a support surface of the header,
    reduce the distance between the feeder and the header, by rotating the cam away from the support surface of the header, the support surface being in contact with the cam during at least a part of a rotation thereof,
    the feeder further comprises one or more hooks, that are rotatable via the actuating component around the axis while maintaining a fixed relative position with respect to the cam, wherein to facilitate the automatic coupling between the header and the feeder the hooks rotate towards the header while the cam moves away from the support surface of the header, so that the hooks thereby grip a bar or pin located on the header, thereby securing the header to the feeder.

2. The agricultural machine according to claim 1, wherein the actuating component includes at least one hydraulic cylinder, configured to actuate the rotation of a lever the lever is configured to actuate the rotation of the hooks and cams around the axis.

3. The agricultural machine according to claim 1, wherein the header includes
    a header drive shaft configured to actuate a rotation of at least one of the rotatable crop gathering and crop cutting parts of the header,
    the feeder comprising a feeder drive shaft that actuates a rotation of the header drive shaft wherein the header includes a first axial coupling claw rotatably coupled to the header drive shaft, and
    the feeder further includes a coupling shaft having a first and second end, the coupling shaft is coupled to the feeder drive shaft at the first end, the coupling shaft including a second axial coupling claw at the second end, the second axial coupling claw is configured to interlock with the first rotatable axial coupling claw, the coupling shaft being located and supported by the feeder in a manner to obtain an automatic interlocking of the first and second coupling claws, when the cams are rotated away from the support surface of the header.

4. The agricultural machine according to claim 3, wherein the coupling shaft is supported by a support bracket attached to the feeder, the bracket including an opening with a diameter which is larger than a diameter of the coupling shaft and wherein the coupling shaft is arranged to be axially slidable with respect to a slider element, while being coupled to said slider element, the slider element being rotatably arranged with respect to the support bracket and wherein a spring is mounted between the second axial claw and the slider element.

5. The agricultural machine according to claim 4, wherein the slider element is configured to rotate in a bearing, arranged in a bearing housing, the spring being configured to push the bearing housing against the support bracket and the bearing housing being in slidable contact with the support bracket.

6. The agricultural machine according to claim 4, wherein the feeder includes a lateral float frame and the bracket is attached to the lateral float frame, and wherein the coupling shaft of the feeder is coupled at a proximal end thereof to the feeder drive shaft via a universal joint.

7. The agricultural machine according to claim 6, wherein the universal joint is coupled to the feeder drive shaft via a belt transmission.

8. The agricultural machine according to claim 4, wherein the first coupling claw is coupled to the header drive shaft through a gearbox attached to the header.

9. The agricultural machine according to claim 8, wherein the header drive shaft is substantially parallel to a rotation axis of the rotatable crop gathering or crop cutting parts and wherein the gearbox is a 90° gearbox attached to the header.

* * * * *